US012608124B2

(12) United States Patent
Zhao et al.

(10) Patent No.: US 12,608,124 B2
(45) Date of Patent: Apr. 21, 2026

(54) FINGER INTERACTION TRAJECTORY ACQUISITION METHOD AND SYSTEM, AND STORAGE MEDIUM

(71) Applicant: KINGFAR INTERNATIONAL INC., Beijing (CN)

(72) Inventors: Qichao Zhao, Beijing (CN); Jieyun Fan, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 0 days.

(21) Appl. No.: 19/002,784

(22) Filed: Dec. 27, 2024

(65) Prior Publication Data
US 2025/0123743 A1 Apr. 17, 2025

Related U.S. Application Data

(63) Continuation of application No. PCT/CN2023/138935, filed on Dec. 14, 2023.

(30) Foreign Application Priority Data

Dec. 30, 2022 (CN) .......................... 202211726813.X

(51) Int. Cl.
G06F 3/0488 (2022.01)
G06T 17/00 (2006.01)
(52) U.S. Cl.
CPC ............. G06F 3/0488 (2013.01); G06T 17/00 (2013.01); *G06T 2200/24* (2013.01)
(58) Field of Classification Search
CPC ........ G06F 3/0488; G06F 3/014; G06F 3/017; G06F 3/0346; G06F 3/04883;
(Continued)

(56) References Cited

U.S. PATENT DOCUMENTS

2014/0201683 A1 7/2014 Holz
2016/0171765 A1* 6/2016 Mehr ...................... G06T 17/20
345/419
(Continued)

FOREIGN PATENT DOCUMENTS

CN 103150020 A 6/2013
CN 109799928 A 5/2019
(Continued)

OTHER PUBLICATIONS

International Search Report dated Mar. 18, 2024 in International Application No. PCT/CN2023/138935. English translation attached.
(Continued)

*Primary Examiner* — David D Davis

(57) ABSTRACT

A finger interaction trajectory acquisition method and system, and a storage medium are provided. The method includes: acquiring, in response to an individual hand interacting with a target object through a finger, motion posture information continuously collected by a three-dimensional motion capture system to obtain three-dimensional position coordinates of a to-be-measured joint or bone of the individual hand; sequentially determining whether a finger position at each timestamp is located on the target object in a predetermined coordinate system, and storing, in response to determining that a finger interaction occurs, the position coordinates of the distal phalanx as an interaction position point and storing the corresponding timestamp; and drawing a finger trajectory and a finger interaction trajectory.

15 Claims, 4 Drawing Sheets

Acquire, during a predetermined finger interaction between an individual hand wearing a motion capture device and a target object, motion posture information continuously collected by a three-dimensional motion capture system, identify the motion posture information to obtain three-dimensional position coordinates of a to-be-measured joint or bone of the individual hand in a same coordinate system as the target object, the three-dimensional position coordinates of the to-be-measured joint or bone having a timestamp, and the to-be-measured joint or bone including at least a distal phalanx of each finger --- S100

Sequentially determine, by using the three-dimensional position coordinates of the distal phalanx of each finger as a finger position, whether the finger position in a predetermined coordinate system is located on the target object at a time point corresponding to each timestamp, and determine, in response to determining that the position coordinates of the distal phalanx of the finger is located on the target object, that a finger interaction occurs at the time point, and storing the position coordinates of the distal phalanx of the finger as an interaction position point and storing the corresponding timestamp --- S200

--- S300

Perform drawing by using time-continuous three-dimensional position coordinates of distal phalanges of all fingers of the individual hand that are sorted according to timestamps to obtain a finger trajectory, and perform drawing by using all interaction position points that are sorted according to the timestamps to obtain a finger interaction trajectory

(58) Field of Classification Search

CPC ..... G06T 17/00; G06T 2200/24; G06T 7/246;
G06T 7/73; G06T 11/00; G06T 11/206;
G06V 10/761; G06V 20/64; G06V 40/28;
G06V 10/80

See application file for complete search history.

(56) References Cited

U.S. PATENT DOCUMENTS

| | | | | |
|---|---|---|---|---|
| 2020/0410638 | A1* | 12/2020 | Yun | G06T 7/90 |
| 2021/0018980 | A1* | 1/2021 | Speck | G06F 3/014 |
| 2022/0366717 | A1* | 11/2022 | Wu | G06F 3/0325 |

FOREIGN PATENT DOCUMENTS

| | | | |
|---|---|---|---|
| CN | 110753898 | A | 2/2020 |
| CN | 111399634 | A | 7/2020 |
| CN | 111596757 | A | 8/2020 |
| CN | 113093911 | A | 7/2021 |
| CN | 114201084 | A | 3/2022 |
| CN | 114489327 | A | 5/2022 |
| CN | 115439876 | A | 12/2022 |
| CN | 115457113 | A | 12/2022 |
| CN | 116860153 | A | 10/2023 |

OTHER PUBLICATIONS

First Office Action from corresponding Chinese Application No. 202211726813.X, dated May 15, 2024. English translation attached.
The Grant Notice from corresponding Chinese Application No. 202211726813.X, dated Jul. 22, 2024. English translation attached.
Human-machine environment synchronization, platform ErgoLAB, ErgoLAB finger trajectory tracking and touch human-computer interaction analysis system(Sep. 27, 2022). https://mp.weixin.qq.com/s/D 850Q8MdcLgvi8YxbhU31g.
Kingfar International Inc., ErgoLAB, Interaction Finger trajectory analysis module(Dec. 1, 2022). http://WWW. ergovr.com/Products-2436233.html.
Extended European Search Report dated Oct. 9, 2025 received in corresponding European Application No. EP23910198.3.

* cited by examiner

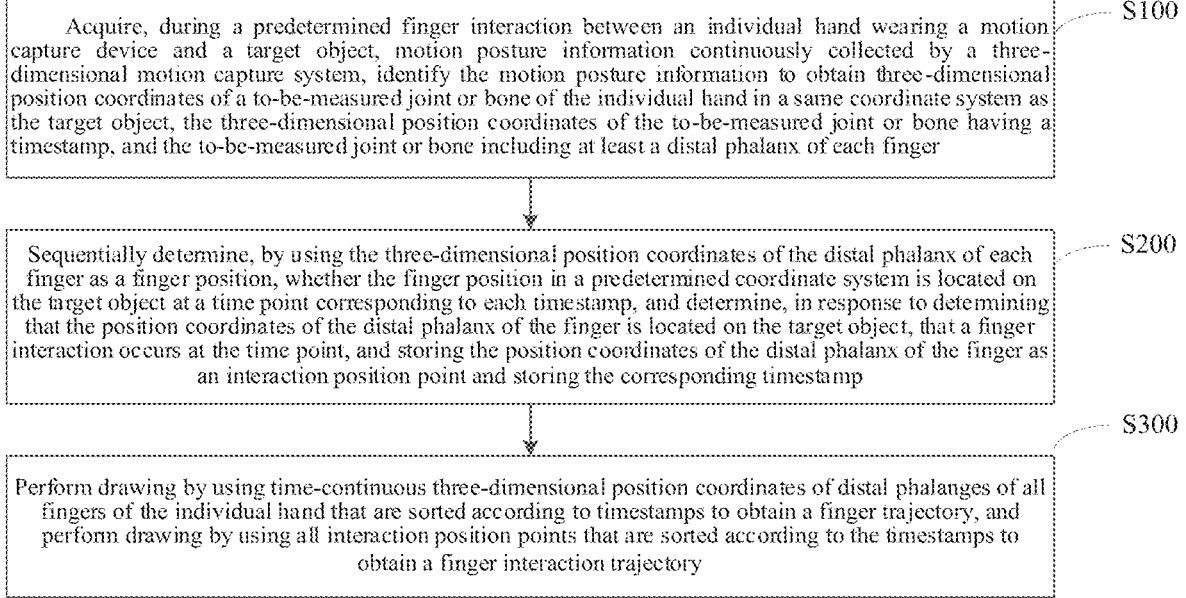

S100

Acquire, during a predetermined finger interaction between an individual hand wearing a motion capture device and a target object, motion posture information continuously collected by a three-dimensional motion capture system, identify the motion posture information to obtain three-dimensional position coordinates of a to-be-measured joint or bone of the individual hand in a same coordinate system as the target object, the three-dimensional position coordinates of the to-be-measured joint or bone having a timestamp, and the to-be-measured joint or bone including at least a distal phalanx of each finger

S200

Sequentially determine, by using the three-dimensional position coordinates of the distal phalanx of each finger as a finger position, whether the finger position in a predetermined coordinate system is located on the target object at a time point corresponding to each timestamp, and determine, in response to determining that the position coordinates of the distal phalanx of the finger is located on the target object, that a finger interaction occurs at the time point, and storing the position coordinates of the distal phalanx of the finger as an interaction position point and storing the corresponding timestamp

S300

Perform drawing by using time-continuous three-dimensional position coordinates of distal phalanges of all fingers of the individual hand that are sorted according to timestamps to obtain a finger trajectory, and perform drawing by using all interaction position points that are sorted according to the timestamps to obtain a finger interaction trajectory

FIG. 1

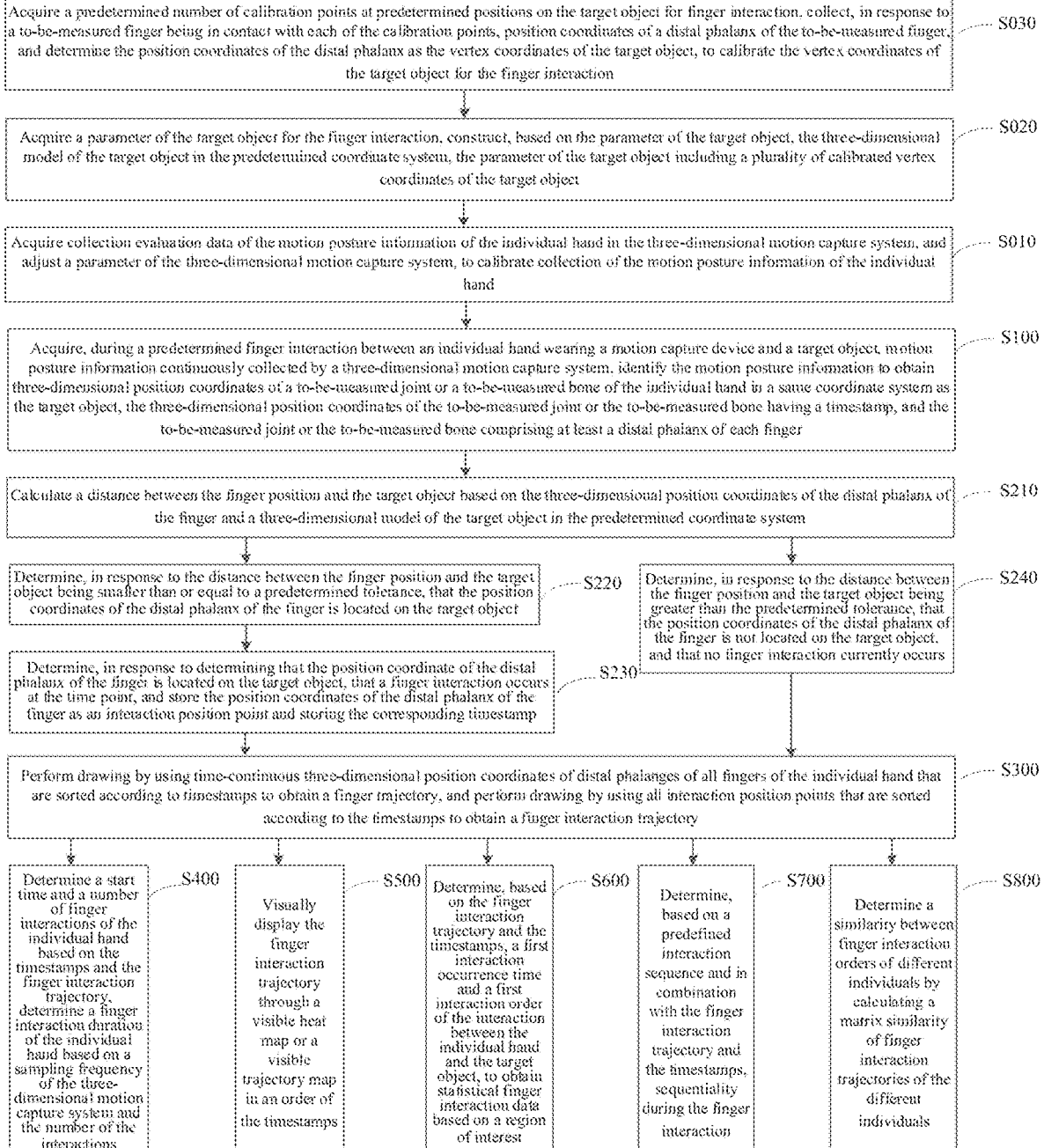

Acquire a predetermined number of calibration points at predetermined positions on the target object for finger interaction, collect, in response to a to-be-measured finger being in contact with each of the calibration points, position coordinates of a distal phalanx of the to-be-measured finger, and determine the position coordinates of the distal phalanx as the vertex coordinates of the target object, to calibrate the vertex coordinates of the target object for the finger interaction — S030

Acquire a parameter of the target object for the finger interaction, construct, based on the parameter of the target object, the three-dimensional model of the target object in the predetermined coordinate system, the parameter of the target object including a plurality of calibrated vertex coordinates of the target object — S020

Acquire collection evaluation data of the motion posture information of the individual hand in the three-dimensional motion capture system, and adjust a parameter of the three-dimensional motion capture system, to calibrate collection of the motion posture information of the individual hand — S010

Acquire, during a predetermined finger interaction between an individual hand wearing a motion capture device and a target object, motion posture information continuously collected by a three-dimensional motion capture system, identify the motion posture information to obtain three-dimensional position coordinates of a to-be-measured joint or a to-be-measured bone of the individual hand in a same coordinate system as the target object, the three-dimensional position coordinates of the to-be-measured joint or the to-be-measured bone having a timestamp, and the to-be-measured joint or the to-be-measured bone comprising at least a distal phalanx of each finger — S100

Calculate a distance between the finger position and the target object based on the three-dimensional position coordinates of the distal phalanx of the finger and a three-dimensional model of the target object in the predetermined coordinate system — S210

Determine, in response to the distance between the finger position and the target object being smaller than or equal to a predetermined tolerance, that the position coordinates of the distal phalanx of the finger is located on the target object — S220

Determine, in response to the distance between the finger position and the target object being greater than the predetermined tolerance, that the position coordinates of the distal phalanx of the finger is not located on the target object, and that no finger interaction currently occurs — S240

Determine, in response to determining that the position coordinate of the distal phalanx of the finger is located on the target object, that a finger interaction occurs at the time point, and store the position coordinates of the distal phalanx of the finger as an interaction position point and storing the corresponding timestamp — S230

Perform drawing by using time-continuous three-dimensional position coordinates of distal phalanges of all fingers of the individual hand that are sorted according to timestamps to obtain a finger trajectory, and perform drawing by using all interaction position points that are sorted according to the timestamps to obtain a finger interaction trajectory — S300

Determine a start time and a number of finger interactions of the individual hand based on the timestamps and the finger interaction trajectory, determine a finger interaction duration of the individual hand based on a sampling frequency of the three-dimensional motion capture system and the number of the interactions — S400

Visually display the finger interaction trajectory through a visible heat map or a visible trajectory map in an order of the timestamps — S500

Determine, based on the finger interaction trajectory and the timestamps, a first interaction occurrence time and a first interaction order of the interaction between the individual hand and the target object, to obtain statistical finger interaction data based on a region of interest — S600

Determine, based on a predefined interaction sequence and in combination with the finger interaction trajectory and the timestamps, sequentiality during the finger interaction — S700

Determine a similarity between finger interaction orders of different individuals by calculating a matrix similarity of finger interaction trajectories of the different individuals — S800

FIG. 2

FINGER INTERACTION TRAJECTORY ACQUISITION METHOD AND SYSTEM, AND STORAGE MEDIUM

CROSS-REFERENCE TO RELATED APPLICATION

The present application is a continuation of International Patent Application No. PCT/CN2023/138935, filed on Dec. 14, 2023, which claims priority to Chinese Patent Application No. 202211726813.X, titled "FINGER INTERACTION TRAJECTORY ANALYSIS METHOD AND SYSTEM, AND STORAGE MEDIUM", and filed with China National Intellectual Property Administration on Dec. 30, 2022, both of which are incorporated herein by reference in their entireties.

FIELD

The present disclosure relates to the field of human-computer interaction technologies, and in particular, to a finger interaction trajectory acquisition method and system, and a storage medium.

BACKGROUND

With the development of digital economy, information technologies, and metaverse-related technologies, more and more information systems are applied in all aspects of production and life, such as information interfaces of intelligent manufacturing systems, HMIs (Human Machine Interfaces) of weapons and equipment and intelligent cabins, smart home mobile terminals, and financial information terminal products. Interaction modes between users and information systems have also expanded from traditional buttons, handles, mice, keyboards, etc. to multi-channel human-machine interaction modes including touch screens, voice, and postures. The touch screen interaction is one of the mainstream modes for current users to interact with information products or interfaces. By collecting and analyzing a finger interaction trajectory of a user during touch screen interaction, rules and habits of the user's interaction with an information system can be learned, to further realize human-centered design, evaluation, and optimization of the information system.

At present, there are two primary methods for acquiring a finger interaction trajectory. One method is based on a video image recognition technology, and includes marking a to-be-captured object (such as a thumb when operating a mobile phone, an entire hand when operating a computer) with a specific color, and tracking and recording, by using a system, a movement trajectory of the object based on the color. Further, a range of each region can be set based on needs of a tester, and indexes during the operation process, such as an activity trajectory of the target object, a start time instant, a movement time period, a movement distance, the number of times of entering and exiting the region, and a residence time length, are calculated by the system. Another method includes identifying a prototype component of an information product and performing calculation based on a pixel position, recording finger interaction data such as an interaction position during an interaction process between an individual and a prototype, and analyzing an interaction trajectory or counting an interaction behavior such as a finger sliding or clicking.

However, the traditional method for acquiring the finger interaction trajectory has the following problems.

(1) No method exists for acquiring a finger interaction trajectory in a three-dimensional space.

Current methods for acquiring the finger interaction trajectory includes interaction analysis based on video image tracking and interaction analysis based on a prototype, which are limited to a two-dimensional space, and there is no method for acquiring a finger interaction trajectory in a three-dimensional space.

(2) The finger trajectory data and the finger interaction data cannot be collected simultaneously.

In the method for acquiring the finger trajectory based on the video image tracking, the movement trajectory data of the target object (such as a finger) is collected, but the interaction data between the finger and the information product is not directly collected. During the interaction process based on the prototype component of the information product, the interaction data between the finger and the information product is first collected, and then the finger interaction trajectory is analyzed. However, the finger trajectory data is not collected. That is, the existing technology cannot realize the simultaneous collection of the finger interaction data and the finger trajectory data.

(3) The range and the object of the data collection are relatively limited.

Currently, the method for collecting the finger trajectory data or the interaction trajectory data is greatly restricted by test conditions and the environment. In the method for acquiring the finger trajectory based on the video image tracking, a camera is required to continuously shoot a tracking target, which limits a tracking range. In the interaction acquisition method based on the prototype, on the one hand, it is necessary to acquire the component information of prototype of the information product, and interaction data for mature and closed products cannot be collected; on the other hand, the interaction data collection range is also limited, and interaction data of operators and a plurality of information products cannot be collected simultaneously.

Therefore, providing a finger interaction trajectory acquisition method that can overcome the limitations of the above-mentioned existing technologies is a technical problem that needs to be solved urgently.

SUMMARY

In view of the above-mentioned problems, embodiments of the present disclosure provide a finger interaction trajectory acquisition method and system, and a storage medium, to eliminate or improve one or more defects existing in the related art.

In one aspect of the present disclosure, a finger interaction trajectory acquisition method is provided. The method includes:

acquiring, during a predetermined finger interaction between an individual hand wearing a motion capture device and a target object, motion posture information continuously collected by a three-dimensional motion capture system, identifying the motion posture information to obtain three-dimensional position coordinates of a to-be-measured joint or a to-be-measured bone of the individual hand in a same coordinate system as the target object, the three-dimensional position coordinates of the to-be-measured joint or the to-be-measured bone having a timestamp, and the to-be-measured joint or the to-be-measured bone including at least a distal phalanx of each finger;

sequentially determining, by using the three-dimensional position coordinates of the distal phalanx of each finger as a finger position, whether the finger position in a predetermined coordinate system is located on the target object at a time point corresponding to each timestamp, determining, in response to determining that the position coordinates of the distal phalanx of the finger is located on the target object, that a finger interaction occurs at the time point, and storing the position coordinates of the distal phalanx of the finger as an interaction position point and storing the corresponding timestamp; and performing drawing by using time-continuous three-dimensional position coordinates of distal phalanges of all fingers of the individual hand that are sorted according to timestamps to obtain a finger trajectory, and performing drawing by using all interaction position points that are sorted according to the timestamps to obtain a finger interaction trajectory.

In some embodiments of the present disclosure, the method further includes:

determining a start time and a number of finger interactions of the individual hand based on the timestamps and the finger interaction trajectory, and determining a finger interaction duration of the individual hand based on a sampling frequency of the three-dimensional motion capture system and the number of the interactions.

In some embodiments of the present disclosure, the method further includes, prior to the acquiring the motion posture information continuously collected by the three-dimensional motion capture system:

acquiring collection evaluation data of the motion posture information of the individual hand in the three-dimensional motion capture system, and adjusting a parameter of the three-dimensional motion capture system, to calibrate collection of the motion posture information of the individual hand.

In some embodiments of the present disclosure, the sequentially determining whether the finger position in the predetermined coordinate system is located on the target object at each time stamp includes:

calculating a distance between the finger position and the target object based on the three-dimensional position coordinates of the distal phalanx of the finger and a three-dimensional model of the target object in the predetermined coordinate system, and determining, in response to the distance between the finger position and the target object being smaller than or equal to a predetermined tolerance, that the position coordinates of the distal phalanx of the finger is located on the target object.

In some embodiments of the present disclosure, the method further includes:

determining, in response to the distance between the finger position and the target object being greater than the predetermined tolerance, that the position coordinates of the distal phalanx of the finger is not located on the target object, to determine that no finger interaction currently occurs.

In some embodiments of the present disclosure, the method further includes, prior to the acquiring the motion posture information continuously collected by the three-dimensional motion capture system:

acquiring a parameter of the target object for the finger interaction, and constructing, based on the parameter of the target object, the three-dimensional model of the target object in the predetermined coordinate system, the parameter of the target object including a plurality of calibrated vertex coordinates of the target object.

In some embodiments of the present disclosure, the method further includes, prior to the acquiring the parameter of the target object for the finger interaction:

acquiring a predetermined number of calibration points at predetermined positions on the target object for the finger interaction; collecting, in response to a to-be-measured finger being in contact with each of the calibration points, position coordinates of a distal phalanx of the to-be-measured finger; and determining the position coordinates of the distal phalanx as the vertex coordinates of the target object, to calibrate the vertex coordinates of the target object for the finger interaction.

In some embodiments of the present disclosure, the predetermined coordinate system includes a spatial rectangular coordinate system, a spatial polar coordinate system, and a spatial spherical coordinate system.

In some embodiments of the present disclosure, the three-dimensional motion capture system performs three-dimensional motion capture using an inertial motion capture mode or an optical motion capture mode.

In some embodiments of the present disclosure, the method further includes:

visually displaying the finger interaction trajectory through a visible heat map or a visible trajectory map in an order of the timestamps.

In some embodiments of the present disclosure, the method further includes:

determining, based on the finger interaction trajectory and the timestamps, a first interaction occurrence time and a first interaction order of the interaction between the individual hand and the target object, to obtain statistical finger interaction data based on a region of interest.

In some embodiments of the present disclosure, the finger interaction trajectory acquisition method further includes:

determining, based on a predefined interaction sequence and in combination with the finger interaction trajectory and the timestamps, sequentiality during the finger interaction.

In some embodiments of the present disclosure, the finger interaction trajectory acquisition method further includes:

determining a similarity between finger interaction orders of different individuals by calculating a matrix similarity of finger interaction trajectories of the different individuals.

In another aspect of the present disclosure, a finger interaction trajectory acquisition system is provided. The finger interaction trajectory acquisition system includes a processor and a memory. The memory has computer instructions stored therein. The processor is configured to execute the computer instructions stored in the memory, and the system, when the computer instructions are executed by the processor, implements the steps of the finger interaction trajectory acquisition method described in any one of the above embodiments.

In yet another aspect of the present disclosure, a computer-readable storage medium is provided. The computer-readable storage medium has a computer program stored thereon. the computer program, when executed by a processor, implements the steps of the finger interaction trajectory acquisition method described in any one of the above embodiments.

In the finger interaction trajectory acquisition method and system, and the storage medium of the present disclosure, the three-dimensional modeling is performed on the target object and the individual hand for the finger interaction in the same coordinate system, and then the finger trajectory data and the finger interaction trajectory data are simultaneously collected and analyzed. Moreover, by collecting information based on the wearable motion capture device, the range and the object of the data collection are not limited to a screen or a camera coverage. In this way, acquisition efficiency and application effectiveness of the finger interaction trajectory can be effectively improved, and computational complexity can be reduced. Thus, comprehensiveness and flexibility of the analysis of the acquired finger interaction trajectory are effectively improved.

Additional advantages, objects, and features of the present disclosure will be explained at least in part in the following description, and will become apparent to those skilled in the art upon examination of the following description, or can be learned from practicing of the present disclosure. The objects and other advantages of the present disclosure can be achieved and obtained by means of structures specifically pointed out in the specification and the accompanying drawings.

It will be appreciated by those skilled in the art that the objects and the advantages that can be achieved by the present disclosure are not limited to the above specific description. The above and other objects that can be achieved by the present disclosure will be more clearly understood from the following detailed description.

BRIEF DESCRIPTION OF THE DRAWINGS

The accompanying drawings described herein are intended to provide a further understanding of the present disclosure, which constitute a part, rather than a limitation, of the present disclosure.

FIG. 1 is a schematic flowchart of a finger interaction trajectory acquisition method according to an embodiment of the present disclosure.

FIG. 2 is a schematic flowchart of a finger interaction trajectory acquisition method according to another embodiment of the present disclosure.

DETAILED DESCRIPTION OF THE EMBODIMENTS

Figure 3:
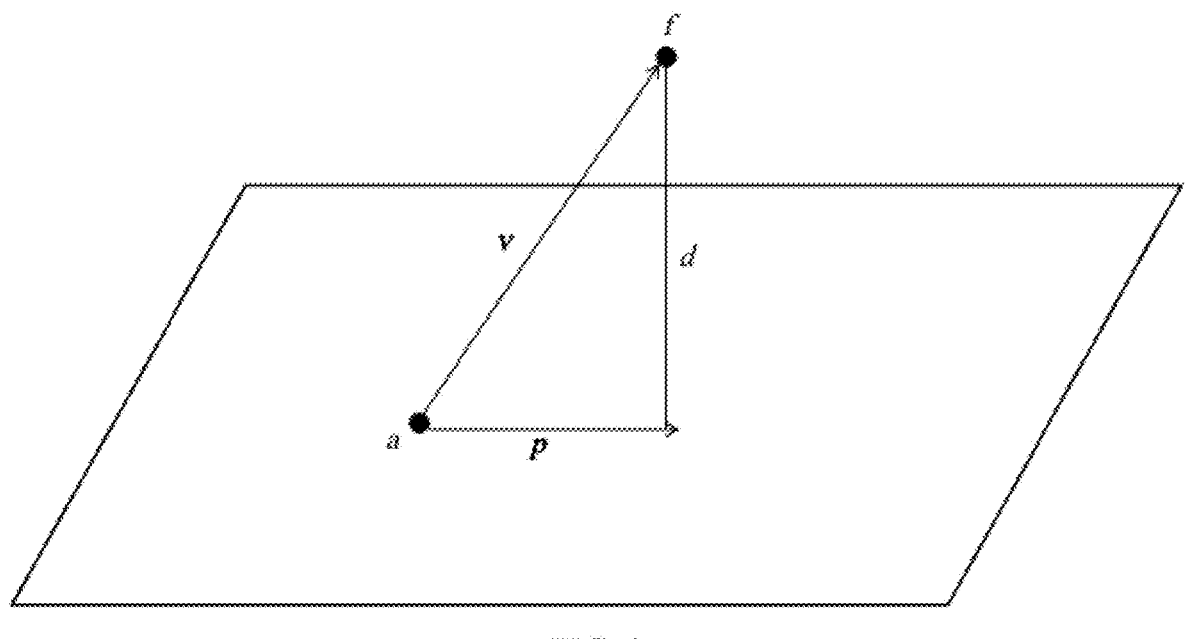
FIG. 3 is a schematic diagram illustrating a principle of determining whether a finger interaction occurs in a same coordinate system according to an embodiment of the present disclosure.

In order to make the objectives, technical solutions, and advantages of the present disclosure more clearly understood, the present disclosure is further described in detail below with reference to the embodiments and the accompanying drawings. Exemplary embodiments of the present disclosure and descriptions thereof are intended to explain the present disclosure, and do not constitute a limitation of the present disclosure.

It should be further noted that, in order to avoid obscuring the present disclosure due to unnecessary details, only structures and/or processing steps closely related to the solutions according to the present disclosure are illustrated in the accompanying drawings, while other details that are not closely related to the present disclosure are omitted.

It should be emphasized that the terms "comprise/contain", when used in this specification, specify the presence of features, elements, steps, or components, but do not preclude the presence or addition of one or more other features, elements, steps, or components.

It should also be noted that, unless otherwise specified, the term "connection" may be used herein to refer not only to a direct connection but also to an indirect connection through an intermediate.

Hereinafter, the embodiments of the present disclosure will be described with reference to the accompanying drawings. In the accompanying drawings, same or similar components or same or similar steps are denoted by same reference numerals.

In traditional solutions for acquiring finger trajectory or finger interaction data, a finger interaction trajectory is analyzed using a video image recognition technology. Therefore, an acquisition range is limited to a range that a camera can capture. Once a finger activity is out of the range, it cannot be collected anymore. Further, calculation based on pixel points greatly increases the computational burden. The method procedure is designed without consideration for acquiring a finger interaction trajectory in a three-dimensional space. Due to the technical limitations, it is impossible to achieve simultaneous acquisition and analysis of a finger trajectory and a finger interaction trajectory, as well as real-time processing and presentation of the finger interaction trajectory. In some scenarios, a finger needs to interact with a specified prototype to collect the finger interaction data, that is, a collected object of the finger interaction is restricted.

In order to overcome the limitations of the traditional methods for acquiring the finger interaction trajectory, a finger interaction trajectory acquisition method is provided according to the present disclosure. The method utilizes a wearable motion capture device and a three-dimensional modeling method in a three-dimensional coordinate system, and performs modeling and calibration on an information product in a scene based on the coordinate system, while collecting a finger trajectory and a finger interaction trajectory, thereby realizing analysis of the collected finger trajectory and the collected finger interaction trajectory.

FIG. 1 is a schematic diagram of a finger interaction trajectory acquisition method according to an embodiment of the present disclosure. The method includes operations at steps S100 to S300.

At step S100, motion posture information continuously collected by a three-dimensional motion capture system is acquired during a predetermined finger interaction between an individual hand wearing a motion capture device and a target object, and the motion posture information is identified to obtain three-dimensional position coordinates of a to-be-measured joint or a to-be-measured bone of the individual hand in a same coordinate system as the target object. The three-dimensional position coordinates of the to-be-measured joint or the to-be-measured bone has a timestamp. The to-be-measured joint or the to-be-measured bone includes at least a distal phalanx of each finger.

It should be noted that the target object is an object performing a human-machine/finger interaction, and may have a planner or three-dimensional shape, which may be regular or irregular. Compared with the related art, only a predetermined number of sampling points are collected for calculation according to the embodiments of the present disclosure, which greatly reduces the amount of calculation and further shortens a processing duration compared with processing performed on pixels or videos in the related art.

Therefore, compared with the traditional technology, real-time analysis and display can be realized according to the embodiments of the present disclosure.

The finger motion capture performed based on the wearable motion capture device is capable of collecting finger data of an individual in an unrestricted environment, and the individual may interact with any object.

At step S200, by using the three-dimensional position coordinates of the distal phalanx of each finger as a finger position, whether the finger position in a predetermined coordinate system is located on the target object is sequentially determined at a time point corresponding to each timestamp, and it is determined that a finger interaction occurs at the time point in response to determining that the position coordinates of the distal phalanx of the finger is located on the target object, and the position coordinates of the distal phalanx of the finger is stored as an interaction position point and the corresponding timestamp is stored.

The distal phalanx, i.e., a third joint of the finger, is a contact point between the human finger and the interaction interface in the human-computer interaction.

At the step S200, the operation of the sequentially determining whether the finger position in the predetermined coordinate system is located on the target object at each timestamp includes: calculating a distance between the finger position and the target object based on the three-dimensional position coordinates of the distal phalanx of the finger and a three-dimensional model of the target object in the predetermined coordinate system; determining, in response to a distance between the finger position and the target object being greater than a predetermined tolerance, that the position coordinates of the distal phalanx of the finger is not located on the target object, and determining, in response to the distance between the finger position and the target object being smaller than or equal to the predetermined tolerance, that the position coordinates of the distal phalanx of the finger is located on the target object.

By introducing the tolerance, a good result in determining the position relationship between the three-dimensional position coordinates of the distal phalanx of the finger and the target object can still obtained when some measurements are not accurate.

At step S300, drawing is performed by using time-continuous three-dimensional position coordinates of distal phalanges of all fingers of the individual hand that are sorted according to timestamps to obtain a finger trajectory, and drawing is performed by using all interaction position points that are sorted according to the timestamps to obtain a finger interaction trajectory.

It can be understood that after obtaining the finger trajectory and the finger interaction trajectory, the finger trajectory and/or the finger interaction trajectory can be further analyzed. Since the efficiency and the acquisition range of acquiring the finger trajectory and the finger interaction trajectory are effectively improved by using the process according to the embodiments of the present disclosure, the efficiency, comprehensiveness, and flexibility of analyzing the obtained finger trajectory and/or the obtained finger interaction trajectory can also be effectively improved.

It can be seen from the above description that, in the finger interaction trajectory acquisition method according to the embodiments of the present disclosure, the three-dimensional modeling of the target object and the individual hand involved in the finger interaction can be performed in the same coordinate system based on the wearable motion capture device, and then the finger trajectory and the finger interaction trajectory are simultaneously collected and analyzed. Moreover, with the information collected by the wearable motion capture device, the range and the object of the data collection are not limited to a screen or camera coverage. In this way, the collection range of the finger interaction trajectory can be effectively expanded. Further, only a predetermined number of sampling points need to be collected for calculation. Compared with the processing performed on the pixels or the videos in the traditional technologies, the amount of calculation can be greatly reduced, and the processing duration can be shortened.

In one or more embodiments of the present disclosure, the predetermined coordinate system includes a spatial rectangular coordinate system, a spatial polar coordinate system, and a spatial spherical coordinate system. The present disclosure is not limited thereto, and the above coordinate systems are only examples. The predetermined coordinate system may also be any other coordinate system or mathematical method that can be used for the spatial three-dimensional modeling.

In one or more embodiments of the present disclosure, a technology used in the three-dimensional motion capture system is an inertial motion capture technology or an optical motion capture technology. The inertial motion capture technology is to measure a movement of a main joint or a bone of a human body in real time using an inertial sensor, calculate a position of the joint of the human body from the data measured in real-time based on a principle of inverse kinematics, and apply the data to a to-be-measured joint or a to-be-measured bone. The optical motion capture technology is to track, relying on a set of precise and complex optical cameras and through a principle of computer vision, target feature points by a plurality of high-speed cameras from different angles to achieve motion capture of a to-be-measured joint or a to-be-measured bone. The optical motion capture technology is based on an Automatic Optical Inspection (AOI) system. The present disclosure is not limited to thereto, and the above three-dimensional motion capture system is only an example. The three-dimensional motion capture technology can be any other existing wearable three-dimensional motion capture system.

In order to further improve effectiveness and flexibility of subsequent analysis of the finger interaction trajectory, in the finger interaction trajectory acquisition method according to the embodiments of the present disclosure, referring to FIG. 2, the finger interaction trajectory acquisition method further includes an operation at step S400 subsequent to the operation at the step S300.

At step S400, a start time and a number of finger interactions of the individual hand are determined based on the timestamps and the finger interaction trajectory, and a finger interaction duration of the individual hand is determined based on a sampling frequency of the three-dimensional motion capture system and the number of the interactions.

In order to further improve application reliability of the motion posture information, in the finger interaction trajectory acquisition method according to the embodiments of the present disclosure, referring to FIG. 2, the finger interaction trajectory acquisition method further includes an operation at step S010, prior to the operation at the step S100.

At step S010, collection evaluation data of the motion posture information of the individual hand in the three-dimensional motion capture system is acquired, and a parameter of the three-dimensional motion capture system is adjusted, to calibrate collection of the motion posture information of the individual hand.

That is, the method further includes, prior to the operation at the step S100: calibrating the collection of the motion posture information of the individual hand. Before continuously collecting the motion posture information by the three-dimensional motion capture system, collection evaluation of the motion posture information of the individual hand in the three-dimensional motion capture system is acquired, and the parameter of the three-dimensional motion capture system is adjusted, to calibrate the collection of the motion posture information of the individual hand. The calibration step facilitates eliminating a system error existing in the three-dimensional motion capture system.

In order to further improve efficiency and effectiveness of sequentially determining whether each finger position in the predetermined coordinate system is located on the target object at each timestamp, in the finger interaction trajectory acquisition method according to the embodiments of the present disclosure, referring to FIG. 2, the step S200 in the finger interaction trajectory acquisition method includes operations at steps S210 to S240.

At step S210, a distance between the finger position and the target object is calculated based on the three-dimensional position coordinates of the distal phalanx of the finger and a three-dimensional model of the target object in the predetermined coordinate system; and then an operation at step S220 or an operation at step S240 is performed.

At step S220, it is determined that the position coordinates of the distal phalanx of the finger is located on the target object in response to the distance between the finger position and the target object being smaller than or equal to a predetermined tolerance.

At step S230: it is determined that a finger interaction occurs at the time point in response to determining that the position coordinates of the distal phalanx of the finger is located on the target object, and the position coordinates of the distal phalanx of the finger is stored as an interaction position point and the corresponding timestamp is stored.

At step S240, in response to the distance between the finger position and the target object being greater than the predetermined tolerance, it is determined that the position coordinates of the distal phalanx of the finger is not located on the target object and that no finger interaction currently occurs.

In order to further improve application effectiveness and reliability of the three-dimensional model of the target object in the step S210, and to further improve efficiency and effectiveness of determining whether the finger position is located on the target object, in the finger interaction trajectory acquisition method according to the embodiments of the present disclosure, referring to FIG. 2, the finger interaction trajectory acquisition method further includes an operation at step S020 prior to the operation at the S010.

At step S020, a parameter of the target object for the finger interaction is acquired, and the three-dimensional model of the target object is constructed in the predetermined coordinate system based on the parameter of the target object. The parameter of the target object includes a plurality of calibrated vertex coordinates of the target object.

The finger interaction trajectory acquisition method according to the embodiments of the present disclosure further includes, prior to the operation at the step S020, an operation at step S030: a predetermined number of calibration points at predetermined positions on the target object for the finger interaction are acquired, position coordinates of a distal phalanx of a to-be-measured finger is collected in response to the to-be-measured finger being in contact with each of the calibration points, and the position coordinates of the distal phalanx is determined as the vertex coordinates of the target object, to calibrate the vertex coordinates of the target object for the finger interaction.

The calibration refers to an operation of detecting, using standard measuring instrument, whether accuracy (precision) of a used instrument meets a standard, and is generally applied for instruments with higher precision. Calibration is performed herein before use to effectively eliminate the system error. A square interface is taken as an example. Four vertices of the interface may be selected as calibration points, and each of the four vertices of the interface is touched by a finger. For each of the four vertices, coordinates of a distal phalanx of the finger collected at the time when the vertice of the interface is touched by the finger is determined as the coordinates of the vertice of the interface, and a position and a size of the interface in a same coordinate system are further determined by the vertex coordinates. The calibration step facilitates eliminating the system error existing in the three-dimensional motion capture system.

In an embodiment of the present disclosure, in the determination of the positional relationship between the distal phalanx of the finger and the target object, the measurement error that may be generated is eliminated based on the introduced tolerance. Reference is made to FIG. 3, which is a schematic diagram illustrating a principle of determining whether a finger interaction occurs in a same coordinate system according to an embodiment of the present disclosure. A square interface is taken as an example in the schematic diagram, information of whether the finger interaction occurs at a time point or a time period may be extracted by determining whether the coordinates of the distal phalanx is within the calibrated and modeled interactive interface. The square interface is taken as an example as follows.

A point a in the interface is randomly selected, a projection vector p on a plane of a vector v formed between each distal phalanx position sampling point f and a is calculated, and a minimum distance d between the distal phalanx position point and the interface is calculated by subtracting the vector p from the vector v. If d'e, it is determined that the finger interaction has occurred; otherwise, it is determined that the finger interaction has not occurred.

Subsequent to the operation at the step S300 according to some embodiments of the present disclosure, that is, subsequent to obtaining the finger interaction trajectory, referring to FIG. 2, the finger interaction trajectory acquisition method further includes operations at steps S500 and S600.

At step 500, the finger interaction trajectory is visually displayed in an order of the timestamps through a visible heat map or a visible trajectory map.

At step 600, a first interaction occurrence time and a first interaction order of the interaction between the individual hand and the target object are determined based on the finger interaction trajectory and the timestamps, to obtain statistical finger interaction data based on a region of interest.

That is, the finger interaction trajectory can be visually displayed in the embodiments of the present disclosure, which includes: displaying, by using the visible heat map or the visible trajectory map, the finger interaction trajectory in a manner of a visible graphic based on the order of the timestamps, and performing statistical analyse to obtain the first interaction time and the first interaction order based on the finger interaction trajectory and the timestamps based on the statistical finger interaction data in the region of the interest.

According to some embodiments of the present disclosure, subsequent to the operation at the step S300, that is, subsequent to obtaining the finger interaction trajectory, referring to FIG. 2, the finger interaction trajectory acquisition method further includes operations at steps 700 and 800.

At step 700, sequentiality during the finger interaction is determined based on a predefined interaction sequence and in combination with the finger interaction trajectory and the timestamps.

At step 800, a similarity between finger interaction orders of different individuals is determined by calculating a matrix similarity of finger interaction trajectories of the different individuals.

That is, the sequentiality analysis of the finger interaction is to determine, based on the predefined interaction sequence and in combination with the finger interaction trajectory and the timestamp, the sequentiality during the finger interaction procedure. In addition, the similarity analysis of the finger interaction trajectories of the different individuals is to compare the similarity of the finger interaction sequences of the different individuals by calculating the matrix similarity of the finger interaction trajectories of the different individuals.

Figure 4:
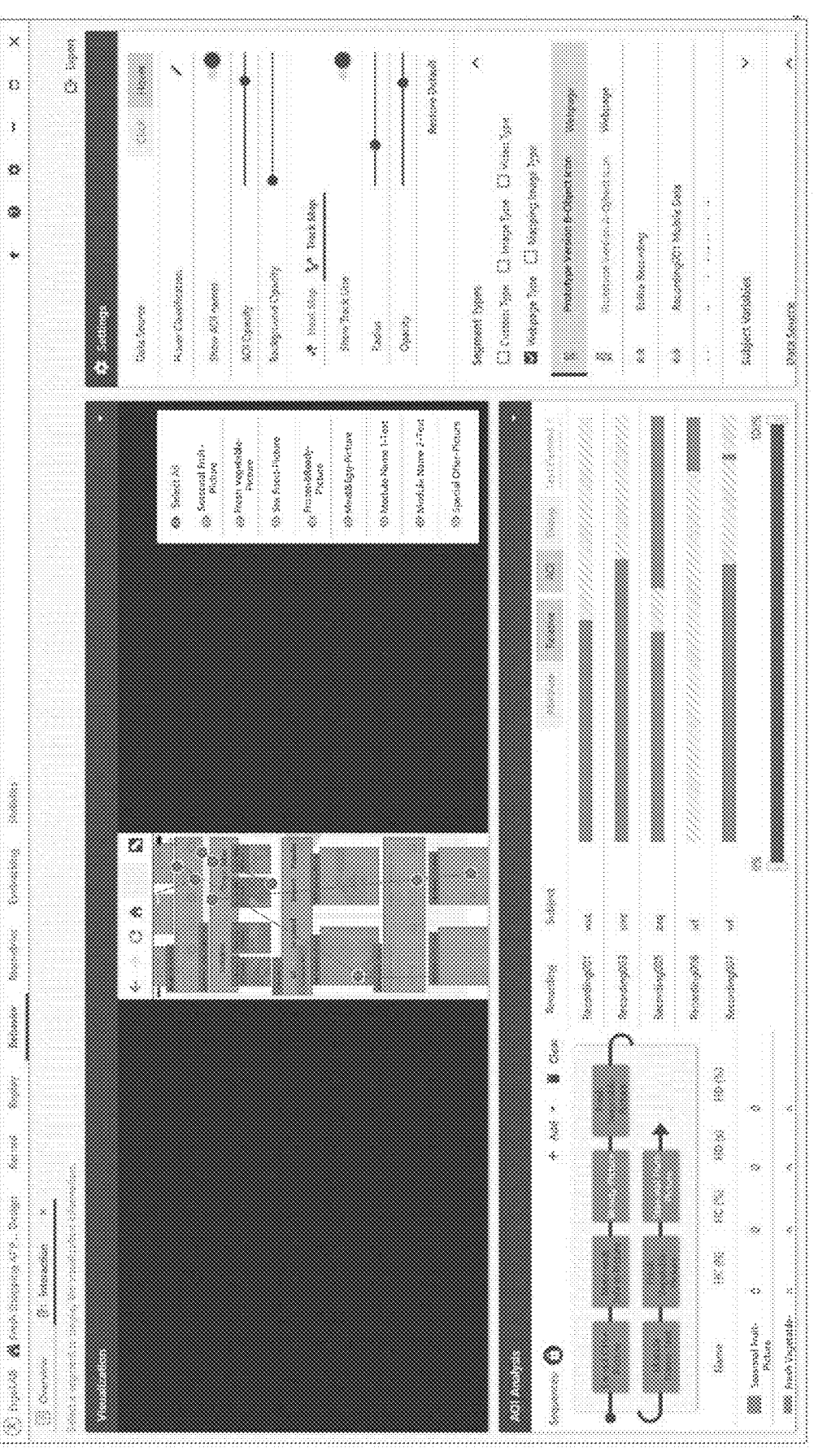
FIG. 4 illustrates an interface for drawing and analyzing a finger interaction trajectory according to an embodiment of the present disclosure.

FIG. 4 is an interface for drawing and analyzing a finger interaction trajectory according to an embodiment of the present disclosure (an original image is displayed in color, and is processed to the current grayscale image as shown in FIG. 4). The region at an upper left part of FIG. 4 displays the finger interaction trajectory for the (square) human-machine interaction interface. This region may be switched to display the finger trajectory. A "settings" region on a right side of FIG. 4 is configured to adjust the data analysis and presentation mode performed based on the finger interaction trajectory. A lower left part of FIG. 4 shows reality and flow box representation of the finger interaction sequence, which visualizes the interaction sequence of the finger during the finger interaction procedure. Based on the finger trajectory data and the finger interaction trajectory data that are collected by this method, evaluation of the human-machine interaction interface by the individuals can be analyzed from multiple angles.

In an embodiment of the present disclosure, a procedure of the finger interaction trajectory acquisition method is as follows.

1) Hand Motion Posture Calibration and Data Acquisition

The hand motion posture data is calibrated and collected by a three-dimensional hand motion capture system. After the calibration, the system can obtain three-dimensional position coordinate data of each joint and each bone of a hand based on a predetermined coordinate system. The three-dimensional position coordinates in the coordinate system are obtained based on a predetermined number of collectors (scanning radars) orderly distributed in a space, and then modeling is completed.

2) Calibration and Modeling of a Target Object for an Human-Machine Interaction

After the hand is calibrated, the target object for the interaction is calibrated and modeled based on the coordinate system for the hand motion data collection. After the hand is calibrated, the target object for the interaction is calibrated and modeled based on the coordinate system for the hand motion data collection. That is, a predetermined number of collection points on the finger is determined, and real-time modeling analysis is performed in the coordinate system.

The target object is the human-computer interaction interface. A square interface is taken as an example. Four vertices of the interface may be selected as calibration points, and each of the four vertices of the interface is touched by a finger. Coordinates of a distal phalanx of the finger collected at the time when each of the four vertices of the interface is touched by the finger is determined as the coordinates of the vertice of the interface, and a position and a size of the interface in a same coordinate system are further determined by the vertex coordinates.

If a complex object needs to be calibrated and modeled, it is necessary to select a appropriate number of calibration points at appropriate positions.

3) Hand Motion Posture Data Collection

After completing the calibration of the hand and the target object, an experimental task is carried out. During the task, the motion posture information of the finger is continuously collected by the hand motion capture system. After the collection is completed, the three-dimensional position coordinate data of each joint and each bone of the hand in the task is obtained. The motion capture system worn by the hand contains a plurality of sensors/receivers.

4) Determine Whether the Finger Interacts with the Target Object

Whether the distal phalanx position of each sampling point is located on the interactive target object is sequentially determined by using position data of the distal phalanx of the finger as the finger position. It is determined that the finger interaction occurs at the time point in response to the position coordinates of the distal phalanx is located on the interactive target object; and it is determined that no finger interaction currently occurs in response to the position coordinates of the distal phalanx is not located on the interactive target object.

The above square interface is taken as an example, by determining whether the coordinates of the distal phalanx is within the range of the calibrated and modeled interactive interface, information of whether the finger interaction occurs at a predetermined time point or a predetermined time period may be extracted to determine whether the finger interaction occurs in combination with the method described in FIG. 2.

5) Drawing of the Finger Trajectory and the Finger Interaction Trajectory

Continuous drawing is performed by using position coordinates of all distal phalanxes to obtain finger trajectories; and drawing is performed by using the interaction position points of all the distal phalanxes and the target object to obtain a finger interaction trajectory.

6) Determination of the Finger Interaction Trajectory

Data of a start time of the finger interaction trajectory, a number of interactions, etc., are determined; and an interaction duration is calculated in combination with a motion capture system sampling rate (fs), where interaction duration=number of interactions×(1/fs).

In some embodiments of the present disclosure, the operation of determining the finger interaction trajectory in the above step 6) further includes: visualized analysis of the finger interaction trajectory, for example, through a visible heat map, a visible trajectory map, etc.; statistical analysis of interaction data based on a region of interest, for example, a first interaction time, the number of interactions, and a first interaction order, etc.; sequentiality analysis of the finger interaction, including: defining an interaction sequence to study the order of finger interaction; and similarity analysis of interaction trajectories of different individuals, including calculating a matrix similarity to study similarity between interaction sequences of the different individuals.

As mentioned above, in the finger interaction trajectory acquisition method according to the present disclosure, the three-dimensional modeling of the target object and the individual hand for the finger interaction can be performed in the same coordinate system based on the wearable motion capture device, and the finger trajectory and the finger interaction trajectory are simultaneously collected and analyzed. Moreover, with the information collected by the wearable motion capture device, the data collection range and the object are not limited to the screen or the camera coverage, which effectively expands the collection range of the finger interaction trajectory. In this way, the limitations of the existing finger interaction trajectory acquisition methods can be effectively overcome.

Compared with the related art, only the predetermined number of sampling points is collected for the calculation in the present disclosure, which greatly reduces the amount of the calculation and further shortens the processing duration compared with processing by pixels or videos in the related art. Therefore, compared with the related art, the real-time analysis and display can be realized in the present disclosure.

Corresponding to the above method, a finger interaction trajectory acquisition system is further provided in the present disclosure. The system includes a computer device. The computer device includes a processor and a memory. The memory has computer instructions stored therein. The processor is configured to execute the computer instructions stored in the memory, and the system, when the computer instructions are executed by the processor, implements the steps of the method described above.

According to embodiments of the present disclosure, a computer-readable storage medium is also provided. The computer-readable storage medium has a computer program stored thereon. The computer program, when executed by a processor, implements the steps of the method described above. The computer-readable storage medium may be a tangible storage medium, such as a Random Access Memory (RAM), a memory, a Read-Only Memory (ROM), an Electrically Programmable ROM, an Electrically Erasable Programmable Read-Only Memory (EEPROM), a register, a floppy disk, a hard disk, a removable storage disk, a Compact Disc Read-Only Memory, CD-ROM, or any other form of storage medium known in the technical field.

Those of ordinary skill in the art should understand that the exemplary components, systems, and methods described in combination with the embodiments disclosed herein can be implemented in hardware, software or a combination thereof. Whether these functions are executed by hardware or software is dependent on particular use and design constraints of the technical solutions. Professional technicians may use different methods to implement the described functions for each specific application, but such implementation should not be considered to be beyond the scope of the present disclosure. When implemented in hardware, it may be, for example, an electronic circuit, an Application-Specific Integrated Circuit (ASIC), appropriate firmware, a plug-in, a function card, etc. When implemented in software, the elements of the present disclosure are programs or code segments configured to perform the required tasks. The program or code segment may be stored in a machine-readable medium, or transmitted on a transmission medium or a communication link via a data signal carried in a carrier wave.

It should be clear that the present disclosure is not limited to the specific configurations and processes described above and shown in the figures. For sake of simplicity, a detailed description of the known methods is omitted herein. In the above-mentioned embodiments, the several specific steps are described and shown as examples. However, the method process of the present disclosure is not limited to the specific steps described and shown, and those skilled in the art may make various changes, modifications, and additions, or change the order between the steps after understanding the spirit of the present disclosure.

In the present disclosure, features described and/or illustrated for one embodiment may be used in the same way or in a similar way in one or more other embodiments, and/or combined with features of other embodiments or replace features of other embodiments.

Although some embodiments of the present disclosure are described above, the present disclosure is not limited to these embodiments. For those skilled in the art, various changes and variations can be made to the embodiments of the present disclosure. Any modifications, equivalent substitutions, and improvements made within the spirit and principle of the present disclosure are to be encompassed by the scope of the claims of the present disclosure.

What is claimed is:

1. A finger interaction trajectory acquisition method, comprising:

acquiring, during a predetermined finger interaction between an individual hand and a target object, motion posture information continuously collected by a three-dimensional motion capture system worn by the individual hand;

identifying the motion posture information to obtain three-dimensional position coordinates of a to-be-measured joint or a to-be-measured bone of the individual hand in a same coordinate system as the target object, the three-dimensional position coordinates of the to-be-measured joint or the to-be-measured bone having a timestamp, and the to-be-measured joint or the to-be-measured bone comprising at least a distal phalanx of each finger;

sequentially determining, by using the three-dimensional position coordinates of the distal phalanx of each finger as a finger position, whether the finger position in a predetermined coordinate system is located on the target object at a time point corresponding to each timestamp, and determining, in response to determining that the position coordinates of the distal phalanx of the finger is located on the target object, that a finger interaction occurs at the time point, and storing the position coordinates of the distal phalanx of the finger as an interaction position point and storing the corresponding timestamp; and performing drawing by using time-continuous three-dimensional position coordinates of distal phalanges of all fingers of the individual hand that are sorted according to timestamps to obtain a finger trajectory, and performing drawing by using all interaction position points that are sorted according to the timestamps to obtain a finger interaction trajectory, wherein said sequentially determining whether the finger position in the predetermined coordinate system is located on the target object at each time stamp comprises:

calculating a distance between the finger position and the target object based on the three-dimensional position coordinates of the distal phalanx of the finger and a three-dimensional model of the target object in the predetermined coordinate system; and determining, in response to the distance between the finger position and the target object being smaller than or equal to a predetermined tolerance, that the position coordinates of the distal phalanx of the finger is located on the target object;

wherein the method further comprises, prior to said acquiring the motion posture information continuously collected by the three-dimensional motion capture system:

acquiring a predetermined number of calibration points at predetermined positions on the target object for the finger interaction;

collecting, in response to a to-be-measured finger being in contact with each of the calibration points, position coordinates of a distal phalanx of the to-be-measured finger;

determining the position coordinates of the distal phalanx as vertex coordinates of the target object, to calibrate the vertex coordinates of the target object for the finger interaction;

acquiring a parameter of the target object for the finger interaction; and constructing, based on the parameter of the target object, the three-dimensional model of the target object in the predetermined coordinate system, the parameter of the target object comprising a plurality of calibrated vertex coordinates of the target object.

2. The finger interaction trajectory acquisition method according to claim 1, further comprising:

determining a start time and a number of finger interactions of the individual hand based on the timestamps and the finger interaction trajectory; and determining a finger interaction duration of the individual hand based on a sampling frequency of the three-dimensional motion capture system and the number of the interactions.

3. The finger interaction trajectory acquisition method according to claim 1, further comprising, prior to said acquiring the motion posture information continuously collected by the three-dimensional motion capture system:

acquiring collection evaluation data of the motion posture information of the individual hand in the three-dimensional motion capture system; and adjusting a parameter of the three-dimensional motion capture system, to calibrate collection of the motion posture information of the individual hand.

4. The finger interaction trajectory acquisition method according to claim 1, further comprising:

determining, in response to the distance between the finger position and the target object being greater than the predetermined tolerance, that the position coordinates of the distal phalanx of the finger is not located on the target object, to determine that no finger interaction currently occurs.

5. The finger interaction trajectory acquisition method according to claim 1, wherein the predetermined coordinate system comprises a spatial rectangular coordinate system, a spatial polar coordinate system, and a spatial spherical coordinate system.

6. The finger interaction trajectory acquisition method according to claim 1, wherein the three-dimensional motion capture system performs three-dimensional motion capture using an inertial motion capture mode or an optical motion capture mode.

7. The finger interaction trajectory acquisition method according to claim 1, further comprising:

visually displaying the finger interaction trajectory through a visible heat map or a visible trajectory map in an order of the timestamps.

8. The finger interaction trajectory acquisition method according to claim 1, further comprising:

determining, based on the finger interaction trajectory and the timestamps, a first interaction occurrence time and a first interaction order of the interaction between the individual hand and the target object, to obtain statistical finger interaction data based on a region of interest.

9. The finger interaction trajectory acquisition method according to claim 1, further comprising:

determining, based on a predefined interaction sequence and in combination with the finger interaction trajectory and the timestamps, sequentiality during the finger interaction.

10. The finger interaction trajectory acquisition method according to claim 1, further comprising:

determining a similarity between finger interaction orders of different individuals by calculating a matrix similarity of finger interaction trajectories of the different individuals.

11. A finger interaction trajectory acquisition system comprising:

a processor; and a memory having computer instructions stored therein, wherein the processor is configured to execute the computer instructions stored in the memory, and the system, when the computer instructions are executed by the processor, implements a finger interaction trajectory acquisition method, the method comprising:

acquiring, during a predetermined finger interaction between an individual hand and a target object, motion posture information continuously collected by a three-dimensional motion capture system worn by the individual hand;

identifying the motion posture information to obtain three-dimensional position coordinates of a to-be-measured joint or a to-be-measured bone of the individual hand in a same coordinate system as the target object, the three-dimensional position coordinates of the to-be-measured joint or the to-be-measured bone having a timestamp, and the to-be-measured joint or the to-be-measured bone comprising at least a distal phalanx of each finger;

sequentially determining, by using the three-dimensional position coordinates of the distal phalanx of each finger as a finger position, whether the finger position in a predetermined coordinate system is located on the target object at a time point corresponding to each timestamp, and determining, in response to determining that the position coordinates of the distal phalanx of the finger is located on the target object, that a finger interaction occurs at the time point, and storing the position coordinates of the distal phalanx of the finger as an interaction position point and storing the corresponding timestamp; and performing drawing by using time-continuous three-dimensional position coordinates of distal phalanges of all fingers of the individual hand that are sorted according to timestamps to obtain a finger trajectory, and performing drawing by using all interaction position points that are sorted according to the timestamps to obtain a finger interaction trajectory, wherein said sequentially determining whether the finger position in the predetermined coordinate system is located on the target object at each time stamp comprises:

calculating a distance between the finger position and the target object based on the three-dimensional position coordinates of the distal phalanx of the finger and a three-dimensional model of the target object in the predetermined coordinate system; and determining, in response to the distance between the finger position and the target object being smaller than or equal to a predetermined tolerance, that the position coordinates of the distal phalanx of the finger is located on the target object:

wherein the method further comprises, prior to said acquiring the motion posture information continuously collected by the three-dimensional motion capture system:

acquiring a predetermined number of calibration points at predetermined positions on the target object for the finger interaction;

collecting, in response to a to-be-measured finger being in contact with each of the calibration points, position coordinates of a distal phalanx of the to-be-measured finger;

determining the position coordinates of the distal phalanx as vertex coordinates of the target object, to calibrate the vertex coordinates of the target object for the finger interaction;

acquiring a parameter of the target object for the finger interaction; and constructing, based on the parameter of the target object, the three-dimensional model of the target object in the predetermined coordinate system, the parameter of the target object comprising a plurality of calibrated vertex coordinates of the target object.

12. The finger interaction trajectory acquisition system according to claim 11, wherein the system, when the computer instructions are executed by the processor, further implements operations of:

determining a start time and a number of finger interactions of the individual hand based on the timestamps and the finger interaction trajectory; and determining a finger interaction duration of the individual hand based on a sampling frequency of the three-dimensional motion capture system and the number of the interactions.

13. The finger interaction trajectory acquisition system according to claim 11, wherein the system, when the computer instructions are executed by the processor, further implements operations of: prior to said acquiring the motion posture information continuously collected by the three-dimensional motion capture system:

acquiring collection evaluation data of the motion posture information of the individual hand in the three-dimensional motion capture system; and adjusting a parameter of the three-dimensional motion capture system, to calibrate collection of the motion posture information of the individual hand.

14. The finger interaction trajectory acquisition system according to claim 11, wherein the system, when the computer instructions are executed by the processor, further implements an operation of:

determining, in response to the distance between the finger position and the target object being greater than the predetermined tolerance, that the position coordinates of the distal phalanx of the finger is not located on the target object, to determine that no finger interaction currently occurs.

15. A non-transitory computer-readable storage medium, having a computer program stored thereon, wherein the computer program, when executed by a processor, implements a finger interaction trajectory acquisition method, the method comprising:

acquiring, during a predetermined finger interaction between an individual hand and a target object, motion posture information continuously collected by a three-dimensional motion capture system worn by the individual hand;

identifying the motion posture information to obtain three-dimensional position coordinates of a to-be-measured joint or a to-be-measured bone of the individual hand in a same coordinate system as the target object, the three-dimensional position coordinates of the to-be-measured joint or the to-be-measured bone having a timestamp, and the to-be-measured joint or the to-be-measured bone comprising at least a distal phalanx of each finger;

sequentially determining, by using the three-dimensional position coordinates of the distal phalanx of each finger as a finger position, whether the finger position in a predetermined coordinate system is located on the target object at a time point corresponding to each timestamp, and determining, in response to determining that the position coordinates of the distal phalanx of the finger is located on the target object, that a finger interaction occurs at the time point, and storing the position coordinates of the distal phalanx of the finger as an interaction position point and storing the corresponding timestamp; and performing drawing by using time-continuous three-dimensional position coordinates of distal phalanges of all fingers of the individual hand that are sorted according to timestamps to obtain a finger trajectory, and performing drawing by using all interaction position points that are sorted according to the timestamps to obtain a finger interaction trajectory, wherein said sequentially determining whether the finger position in the predetermined coordinate system is located on the target object at each time stamp comprises:

calculating a distance between the finger position and the target object based on the three-dimensional position coordinates of the distal phalanx of the finger and a three-dimensional model of the target object in the predetermined coordinate system; and determining, in response to the distance between the finger position and the target object being smaller than or equal to a predetermined tolerance, that the position coordinates of the distal phalanx of the finger is located on the target object;

wherein the method further comprises, prior to said acquiring the motion posture information continuously collected by the three-dimensional motion capture system:

acquiring a predetermined number of calibration points at predetermined positions on the target object for the finger interaction;

collecting, in response to a to-be-measured finger being in contact with each of the calibration points, position coordinates of a distal phalanx of the to-be-measured finger;

determining the position coordinates of the distal phalanx as vertex coordinates of the target object, to calibrate the vertex coordinates of the target object for the finger interaction;

acquiring a parameter of the target object for the finger interaction; and constructing, based on the parameter of the target object, the three-dimensional model of the target object in the predetermined coordinate system, the parameter of the target object comprising a plurality of calibrated vertex coordinates of the target object.

* * * * *